(12) United States Patent
Ikeda et al.

(10) Patent No.: US 8,393,728 B2
(45) Date of Patent: Mar. 12, 2013

(54) METHOD FOR FORMING INK-JET IMAGE

(75) Inventors: Masashi Ikeda, Tokyo (JP); Hirotaka Iijima, Tokyo (JP); Hisashi Mori, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 425 days.

(21) Appl. No.: 12/731,417

(22) Filed: Mar. 25, 2010

(65) Prior Publication Data

US 2010/0253734 A1    Oct. 7, 2010

(30) Foreign Application Priority Data

Apr. 6, 2009 (JP) ................. 2009-091929

(51) Int. Cl.
| | |
|---|---|
| B05D 1/02 | (2006.01) |
| B05D 1/36 | (2006.01) |
| B05D 3/02 | (2006.01) |
| B05D 5/00 | (2006.01) |
| B05D 7/00 | (2006.01) |
| B41J 2/01 | (2006.01) |
| B41J 2/17 | (2006.01) |
| B41J 2/175 | (2006.01) |
| B41J 29/38 | (2006.01) |
| C09D 5/00 | (2006.01) |
| C09D 11/00 | (2006.01) |
| G01D 11/00 | (2006.01) |

(52) U.S. Cl. ................ 347/102; 347/1; 347/17; 347/85; 347/95; 347/100; 347/101; 427/256; 427/314; 427/407.1; 427/422; 523/160; 523/161

(58) Field of Classification Search ................ 347/1, 17, 347/85, 95, 100, 101, 102; 523/160, 161; 427/256, 314, 407.1, 422
See application file for complete search history.

(56) References Cited

FOREIGN PATENT DOCUMENTS

| | | |
|---|---|---|
| JP | 11189741 | 7/1999 |
| JP | 2002226739 | 8/2002 |
| JP | 2004010814 | 1/2004 |
| JP | 2008208153 | 2/2007 |

OTHER PUBLICATIONS

European Search Report No. EP 10 15 8566 dated Jun. 22, 2010.

*Primary Examiner* — Patrick Niland
(74) *Attorney, Agent, or Firm* — Lucas & Mercanti, LLP

(57) ABSTRACT

Provided are an aqueous ink-jet ink and a method for forming an ink-jet image enabling to decrease bleed occurrence during high-speed printing and to realize highly detailed image quality. An aqueous ink-jet ink characterized by containing water, a pigment, an organic or inorganic amine salt, and a water-soluble resin having a higher pKa than an acid component formed by dissociation of the amine salt in an ink.

14 Claims, 2 Drawing Sheets

METHOD FOR FORMING INK-JET IMAGE

CROSS-REFERENCE TO RELATED APPLICATION

This application is based on Japanese Patent Application No. 2009-091929 filed on Apr. 6, 2009 with Japan Patent Office, the entire content of which is hereby incorporated by reference.

TECHNICAL FIELD

The present invention relates to an aqueous ink-jet ink and a method for forming an ink-jet image.

BACKGROUND

A method for forming an ink-jet image can form an image easily and inexpensively, being thereby utilized in a wide variety of printing fields such as photography, various prints, signs, or color filters. When exclusive paper featuring optimum characteristics for ink-jet recording is used, image quality comparable to that of silver halide photography can be realized. However, printing requiring such exclusive paper results in high cost and limited applications.

Over recent years, applications to high-speed printing to nonabsorbable media (vinyl chloride, art paper, or coated paper) have been expanding. However, when an image is formed on such a medium using aqueous inks, there has been produced such a problem that spotting and bleeding (hereinafter referred to as bleed) occur due to aggregation among inks. To improve this image quality degradation, it is known that ink viscosity needs to increase to some extent immediately after printing.

As a technology to improve image quality degradation by increasing viscosity immediately after printing an ink-jet ink containing a water-soluble resin neutralized with an amine as a binder resin at 2%-10% in terms of solid is used, whereby bleed is considered to be improved via a method of printing while a recording medium is heated (for example, Unexamined Japanese Patent Application Publication (hereinafter referred to as JP-A) No. 2008-208153). It is described that such ink thickening is specifically markedly exhibited in an ink employing a water-soluble organic solvent selected from glycol ethers or 1,2-alkanediols. It is thought that drying accelerates water evaporation, whereby the ratio of a glycol ether or 1,2-alkanediol component in a deposited ink is increased and then the interaction of each water-soluble resin is enhanced, resulting in an increase in ink viscosity.

Although this method realizes an increase in viscosity after deposition due to heating and the presence of a specific solvent and also bleed is improved to some extent in a nonabsorbable medium, the increasing rate of ink viscosity has been inadequate in high-speed printing. Therefore, to achieve high image quality in high-speed printing, a rapid viscosity increase after ink deposition is a critical challenge.

Further, as another technology, disclosed is a thermal history display dye ink which contains an allochroic dye varying with pH changes and a volatile organic amine; and utilizes a pH decrease via volatilization of an ammonium salt, (for example, JP-A No. 11-189741). However, deposition and aggregation of a resin and a pigment utilizing such a pH decrease are not described.

It is described that a hydrolyzable silane compound and an ammonium salt are contained, and the ammonium salt releases an amine or ammonia with water evaporation; and then the action of the residual acid accelerates polycondensation reaction, resulting in enhanced water resistance (for example, JP-A No. 2004-10814). However, it is not specifically described that a resin having a higher pKa than an acid component formed by dissociation of an amine salt in ink is contained, and no disclosure is made with respect to a technological thought on viscosity increase using deposition and aggregation of a resin and a pigment to improve image quality.

It is described that an ink containing barium hydroxide and an ammonium salt can reduce bleed. A viscosity increase via endothermic reaction of such barium hydroxide and an ammonium salt is utilized, but it is not specifically described that a resin is contained (for example, JP-A No. 2002-226739).

| Patent Document 1 | Unexamined Japanese Patent Application Publication (hereafter referred to as JP-A) No. 2008-208153 |
|---|---|
| Patent Document 2 | JP-A No. 11-189741 |
| Patent Document 3 | JP-A No. 2004-10814 |
| Patent Document 4 | JP-A No. 2002-226739 |

SUMMARY

An object of the present invention is to provide an aqueous ink-jet ink and a method for forming an ink-jet image enabling to decrease bleed occurrence during high-speed printing and to realize highly detailed image quality, and the object is to provide specifically a method for forming an ink-jet image preventing bleed generated during high-speed printing to a nonabsorbable medium.

The above object of the present invention can be achieved by the following constitution:

1. An aqueous ink-jet ink containing water, a pigment, an organic or inorganic acid, an amine, and a resin having a higher pKa than the acid.
2. An aqueous ink-jet ink containing water, a pigment, an organic or inorganic amine salt, and a water-soluble resin having a higher pKa than an acid component formed by dissociation of the amine salt in an ink.
3. A method for forming an ink-jet image, wherein when an image is formed using an aqueous ink-jet ink described in any of items 1 and 2, an image formed surface is heated.
4. The method for forming the ink-jet image, described in item 3, wherein the image formed surface is heated at 40° C.-90° C.

When an image is formed using the method for forming the ink-jet image of the present invention, highly detailed image quality with no bleed even during high-speed printing can be provided.

DESCRIPTION OF THE PREFERRED EMBODIMENT

Figure 1:
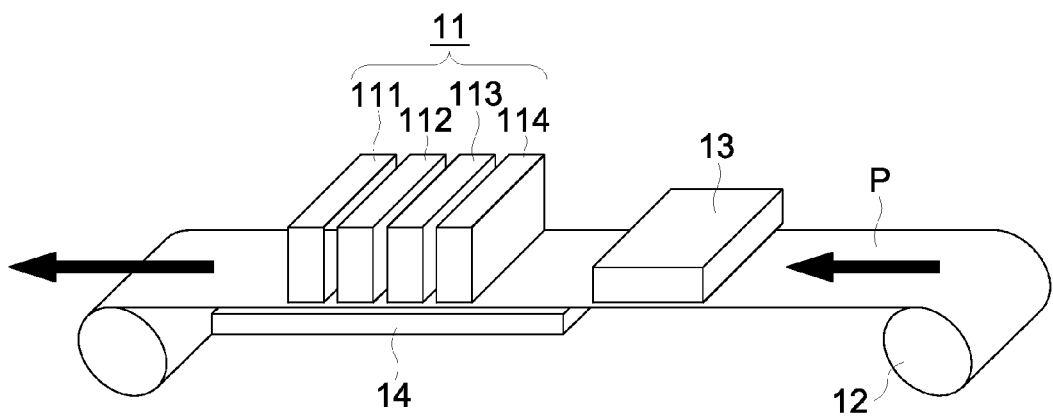
FIG. 1 is one example of an image forming apparatus of a method for forming an ink-jet image according to the present invention.

To achieve the above object, the present inventors conducted diligent investigations and thereby found that only allowing the interaction of each water-soluble resin to increase by raising the ratio of a specific solvent via water evaporation by drying was inadequate for high-speed Printing and in order to further raise the viscosity increase rate, it was effective that the pH of an ink was decreased and thereby the solubility of a resin and the dispersibility of a pigment were decreased, whereby deposition and aggregation were allowed to occur to increase the interaction of each resin or each pigment, or between the resin and the pigment.

In an ink containing an amine-neutralized resin, when pH changes were examined during evaporation of the ink on a heated medium, it was found that the pH was decreased to some extent via evaporation of the amine in the ink; but the pH was not decreased to the extent that the resin and the pigment was deposited and aggregated. The reason is presumed as follows: the energy to dissociate an amine which is a counter of a water-soluble resin is larger than the energy provided for the ink by heating of several tens degrees, and thereby, a most amount of the amine being the counter is not volatilized in a short period of time, resulting in no pH decrease.

Therefore, an organic or inorganic acid and an amine described in the present invention were added and the pH decrease was accelerated by heating, and thereby the solubility of a resin and the dispersibility of a pigment were decreased, whereby deposition and aggregation were allowed to occur to increase the interaction of each resin or each pigment, or between the resin and the pigment, leading to a technological thought to decrease bleed.

The present invention will now be detailed further.

In the present invention, an aqueous ink jet ink containing water, a pigment, an organic or inorganic acid, an amine, and a resin having a higher pKa than the acid component is heated, and thereby the pH decrease is accelerated and the solubility of a resin and the dispersibility of a pigment are decreased, whereby deposition and aggregation are allowed to occur to increase the interaction of each resin or each pigment, or between the resin and the pigment, resulting in bleed reduction.

<<Aqueous Ink-Jet Ink>> (Hereinafter Also Referred to Simply as Ink-Jet Ink or Ink)

The ink of the present invention is characterized as an ink containing water, a pigment, an organic or inorganic acid, an amine, and a resin having a higher pKa than the acid. Further, the image formed surface of a recording medium is heated at 40° C.-90° C. during ink-jet recording whereby a bleed reduction effect can further be produced.

It is known that the viscosity of an ink is increased after deposition and then the flowage thereof is prevented, whereby bleed is reduced. Also in the present invention, it is thought that image quality was improved via the viscosity increase of an ink after deposition.

The inventors of the present invention presume that the viscosity increase of the ink of the present invention is induced by increasing the interaction of each resin or each pigment, or between the resin and the pigment via deposition and aggregation produced by decreasing the solubility of a resin and the dispersibility of a pigment by pH decreasing Namely, it is assumed that an organic or inorganic acid and an amine in an ink play the following role in viscosity increase after ink deposition.

An amine in the ink is released as ammonia or an amine other than this after deposition, whereby $H^+$ in the liquid is increased, resulting in a pH decrease.

Only an acid component having been dissociated in the ink remains via volatilization of such ammonia or an amine. Then, based on the equilibrium relation in the aqueous solution, the counter of a resin having a relatively large pKa is preferentially blocked, resulting in deposition and aggregation of the resin and the pigment.

By the presence of a water-soluble salt, the ink is concentrated via evaporation of water and the concentration of solids is increased, whereby the deposition of the resin and the aggregation of the pigment are further accelerated via salting-out.

The above effect is produced to a large extent when an organic or inorganic acid and an amine are formed from an organic or inorganic amine salt, and further a specifically large effect is produced when the resin is water-soluble.

(Organic or Inorganic Acids)

With regard to an organic or inorganic acid according to the present invention, any acids are usable if a pKa relationship is satisfied with respect to a resin present in an ink. Any of these acids exists in the state of an ion dissociated from a hydrogen ion in the ink, in a state of combination with a hydrogen ion, or in both states. In the present invention, those in any state in the ink are referred to as acids.

As the acids, listed are, for example, phosphoric acid, sulfuric acid, acetic acid, citric acid, phthalic acid, lactic acid, benzoic acid, succinic acid, salicylic acid, tartaric acid, amidosulfuric acid, oxalic acid, formic acid, hydrofluoric acid, hydrochloric acid, bromic acid, iodic acid, and nitric acid, which, however, are not limited.

An organic or inorganic acid used in the present invention preferably has a pKa of at most 5. When plural acids are added, the lowest pKa needs only to be at most 5. Incidentally, the pKa herein referred to represents the absolute value of the logarithmic value of the reciprocal of acid dissociation constant Ka, and a smaller numeric value thereof represents a stronger acid and a larger numeric value represents a weaker acid.

As amines, listed are, in addition to ammonia, monoethanolamine, diethanolamine, triethanolamine, ethyl monoethanolamine, n-butyl monoethanolamine, dimethyl ethanolamine, diethyl ethanolamine, ethyl diethanolamine, n-butyl diethanolamine, di-n-butyl ethanolamine, and triisopropanolamine, which, however, are not limited.

The concentration of any of these amines in an ink is preferably 0.01 mol/L-3 mol/L.

(Organic or Inorganic Amine Salts)

In the present invention, organic or inorganic acids and amines are preferably those obtained by dissociation of organic or inorganic amine salts via addition of such organic or inorganic salts in an ink. An organic or inorganic amine salt according to the present invention has a pKa of at most 5 as an acid component formed via dissociation of the amine salt in the ink, representing one obtained via neutralization of the acid component with an immonium ion or an organic amine. With regard to acid components having plural pKa's, the lowest pKa needs only to be at most 5.

As organic or inorganic ammonium salts obtained via neutralization of an acid component with an ammonium ion, listed are, for example, tri-ammonium phosphate, ammonium sulfide, ammonium acetate, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium oxalate, ammonium hydrogen oxalate, ammonium formate, ammonium fluoride, ammonium chloride, ammonium bromide, ammonium iodide, ammonium nitrate, and ammonium sulfate, which, however, are not limited.

An amine may be used instead of an ammonium ion, and examples of the amine include monoethanolamine, diethanolamine, triethanolamine, ethyl monoethanolamine, n-butyl monoethanolamine, dimethyl ethanolamine, diethyl ethanolamine, ethyl diethanolamine, n-butyl diethanolamine, di-n-butyl ethanolamine, and triisopropanolamine, which, however, are not limited.

To further produce the effects of the present invention, a salt obtained via neutralization with an ammonium ion having a low-boiling point is preferable. Preferable are ammonium acetate, di-ammonium citrate, tri-ammonium citrate, ammonium phthalate, ammonium lactate, ammonium benzoate, ammonium succinate, ammonium salicylate, ammonium tartrate, ammonium hydrogen tartrate, ammonium amidosulfate, ammonium formate, ammonium fluoride, ammonium chloride, ammonium bromide, ammonium iodide, ammonium nitrate, and ammonium sulfate. Of these, ammonium acetate, ammonium tartrate, ammonium formate, and ammonium nitrate are more preferable.

In the preferred embodiment of the present invention, to realize the action of pH decrease, an organic or inorganic amine salt is added.

The content rate of the organic or inorganic acid in an ink is preferably 0.1% by mass-10% by mass based on the ink. The added amount of the organic or inorganic ammonium salt is preferably 0.1%-10% in terms of mass percentage based on the total ink amount, more preferably 0.2%-less than 5.0%. In the case of at least 0.1%, the pH of the ink can adequately be decreased. In the case of at most 10%, deterioration of the working environment caused by the increase of the amount of ammonia released via volatilization can be reduced.

<Resins>

A resin according to the present invention is characterized as a resin having a higher pKa as an acid component of the resin than the pKa of the above organic or inorganic acid. When the organic or inorganic acid is supplied into an ink from an organic or inorganic amine salt, preferable is a resin having a higher pKa as an acid component of the resin than the pKa of an acid component formed via dissociation of an amine salt in the ink. The resin may be adsorbed to a pigment or may be present in the dissolved state for fixability or gloss enhancement. However, the state of being adsorbed to the pigment is preferable. In view of increasing viscosity, in addition to a resin adsorbed to the pigment, the resin is preferably added further in ink preparation, since the interaction of each resin or each pigment, or between the resin and the pigment is allowed to increase when pH is decreased. Herein, a resin adsorbed to the pigment and a resin added in ink preparation may be the same or differ. When a plurality of the resins are added, at least one type thereof needs only to be a resin having a higher pKa as an acid component of the resin than the pKa of an organic or inorganic acid. All the plural resins added preferably have higher pKa's as the acid components of the resins than the pKa of such an organic or inorganic acid. A resin having a higher pKa than the pKa of the organic or inorganic acid of the present invention is preferably water-soluble.

Neutralization of an acid component of a resin is not specifically limited. As examples of the neutralization, an amine, sodium, and lithium are cited. A counter amine is volatilized after drying. Therefore, from the viewpoint of water resistance, a resin having an acid neutralized with an amine is preferable.

A resin according to the present invention is preferably a resin in which an acid functional group such as a carboxyl group or a sulfo group is contained in a resin and the acid functional group in the resin is neutralized with an amine. Specific examples can be realized in such a manner that a part of a resin such as acrylic-based, styrene acrylic-based, acrylonitrile-acrylic-based, vinyl acetate acrylic-based, polyurethane-based, or polyester-based one is modified with an acid such as a carboxyl group or a sulfo group and then the resin is neutralized with an amine. As examples of such an amine used for neutralization, ammonia, dimethylamine, diethylamine, and ethylmethylamine are preferable. Ammonia of a low boiling point to further produce the effects of the present invention is specifically preferable.

A resin having an acid can be obtained by polymerizing a monomer. As such a monomer, those obtained via radical copolymerization of acrylic acid, methacrylic acid, itaconic acid, fumaric acid, or acid derivatives of styrene are listed. Further, copolymerization with another monomer may be carried out if appropriate.

The weight average molecular weight of a resin having an acid is preferably at least 3000 from the viewpoint of an image quality improvement effect according to the present invention and is preferably at most 30000 from the viewpoint of ejection properties and viscosity, more preferably 10000-20000. Further, the acid value is preferably 60 mgKOH/g-less than 300 mgKOH/g.

The content of a resin according to the present invention is preferably 0.5%-15% based on the total ink amount, more preferably 2.0%-10%. The content of a resin having an acid neutralized with an amine is 0.5%-15% based on the total ink amount, more preferably 2.0%-10%. In the case of at least 0.5%, an adequate viscosity increasing effect is produced. In the case of at most 15%, enhancement of the effect is expected and excellent ejection properties are maintained.

<Other Resins>

Further, an ink according to the present invention may contain resins differing from a resin neutralized with the above amine for various purposes. Plural types of these resins may be added or copolymers thereof may be added, or these polymers may be dispersed in an emulsion state. When dispersion is carried out in such an emulsion state, from the viewpoint of impairing ejection properties based on an ink-jet system, the average particle diameter of resin fine particles is preferably at most 300 nm. In the case of a water-soluble polymer, the composition and the molecular weight are not specifically limited, but the weight average molecular weight is preferably at most 50000.

In the present invention, the difference between pKa of an organic or inorganic acid and pKa of a resin is preferably at least 0.5, more preferably at least 1.

<Water>

An ink according to the present invention contains water. The content of water in the ink is preferably at least 20% by mass-90% by mass.

<Water-Soluble Organic Solvents>

An ink according to the present invention may contain a water-soluble organic solvent. When the above resin is dissolved, a water-soluble organic solvent is preferably contained, as an ink solvent, in addition to water of 20% by mass-90% by mass for ejection properties enhancement and ink physical properties adjustment. Unless the effects of the present invention is impaired, types of water-soluble organic solvents are not specifically limited, including, for example, glycerin, propylene glycol, dipropylene glycol, tripropylene glycol, tetrapropylene glycol, polypropylene glycol, ethylene glycol, diethylene glycol, triethylene glycol, tetraethylene glycol, polyethylene glycol, decaglycerin, 1,4-butanediol, 1,3-butanediol, 1,2,6-hexanetriol, 2-pyrrolidinone, dimethylimidazolidinone, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, propylene glycol monobutyl ether, dipropylene glycol monomethyl ether, dipropylene gly col monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tripropylene glycol dibutyl ether, 3-methyl-2,4-pentanediol, diethylene glycol monoethyl ether acetate, 1,2-hexanediol, 1,2-pentanediol, and 1,2-butanediol.

<Pigments>

As a pigment usable for an ink according to the present invention, those conventionally well-known can be used with no limitation. Any water-dispersible pigments and solvent-dispersible pigments are usable. For example, organic pigments such as insoluble pigments or lake pigments and inorganic pigments such as carbon black can preferably be used.

Such insoluble pigments are not specifically limited. Preferable are, for example, azo, azomethine, methine, diphenylmethane, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole.

As specific pigments which are preferably usable, the following pigments are listed:

As magenta or red pigments, listed are, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

As orange or yellow pigments, listed are, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 74, C.I. Pigment Yellow 93, C.I. Pigment Yellow 128, C.I. Pigment Yellow 94, and C.I. Pigment Yellow 138.

As green or cyan pigments, listed are, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Other than the above pigments, when red, green, blue, or intermediate colors are required, the following pigments are preferably used individually or in combination. Used are, for example, C.I. Pigment Red: 209, 224, 177, and 194; C.I. Pigment Orange: 43; C.I. Vat Violet: 3; C.I. Pigment Violet: 19, 23, and 37; C.I. Pigment Green: 36 and 7; and C.I. Pigment Blue: 15:6.

Further, as black pigments, C.I. Pigment Black 1, C.I. Pigment Black 6, and C.I. Pigment Black 7 are listed.

Any pigment used in the present invention is preferably used via dispersion using a homogenizer, together with dispersants, as well as additives required for various desired purposes. As the homogenizer, usable are a well-known ball mill, sand mill, line mill, and high-pressure homogenizer.

The average particle diameter of a pigment dispersion used for an ink according to the present invention is preferably 10 nm-200 nm, more preferably 10 nm-100 nm, still more preferably 10 nm-50 nm.

Particle diameter determination can be carried out using a commercially available particle diameter analyzer employing, for example, a light scattering method, an electrophoretic method, or a laser Doppler method. Further, using a transmission electron microscope, pigment particle image photographing is carried out for at least 100 particles and this image is statistically processed using an image analyzing software such as Image-Pro (produced by Media Cybernetics, Inc.) for such particle diameter determination.

<Surfactants>

An ink according to the present invention preferably contains surfactants for ejection properties enhancement and wettability enhancement. As such surfactants used, any of cathionic, anionic, amphoteric, and nonionic surfactants is usable. Specific examples of surfactants applicable to the present invention are not specifically limited but the following is preferably usable.

As cationic surfactants, listed are, for example, aliphatic amine salts, aliphatic quaternary ammonium salts, benzalkonium salts, benzethonium chloride, pyridinium salts, and imidazolinium salts.

As anionic surfactants, listed are, for example, fatty acid soap, N-acyl-N-methylglycine salts, N-acyl-N-methyl-β-alanine salts, N-acylglutamic acid salts, acylated peptides, allylsulfonic acid salts, alkylbenzenesulfonic acid salts, alkylnaphthalenesulfonic acid salts, dialkylsulfosuccinic acid ester salts, alkylsulfoacetic acid salts, α-olefinsulfonic acid salts, N-acylmethyltauline, sulfated oil, higher alcohol sulfuric acid ester salts, secondary higher alcohol sulfuric acid ester salts, alkyl ether sulfuric acid salts, secondary higher alcohol ethoxysulfates, polyoxyethylene alkyl phenyl ether sulfuric acid salts, monoglysulfates, fatty acid alkylolamide sulfuric acid ester salts, alkyl ether phosphoric acid ester salts, and alkyl phosphoric acid ester salts.

As amphoteric surfactants, listed are, for example, carboxybetaine types, sulfobetaine types, aminocarboxylic acid salts, and imidazolinium betaine. And as nonionic surfactants, listed are, for example, polyoxyethylene secondary alcohol ether, polyoxyethylene alkyl phenyl ether, polyoxyethylene sterol ether, polyoxyethylene lanolin derivatives, polyoxyethylene polyoxypropylene alkyl ether, polyoxyethylene glycerin fatty acid esters, polyoxyethylene castor oil, cured castor oil, polyoxyethylene sorbitol fatty acid esters, polyoxyethylene glycol fatty acid esters, fatty acid monoglyceride, polyglycerin fatty acid esters, sorbitan fatty acid esters, propylene glycol fatty acid ester, saccharose fatty acid esters, fatty acid alkanolamides, polyoxyethylene fatty acid amides, polyoxyethylene alkylamines, alkylamine oxides, acetylene glycol, and acetylene alcohols.

Further, from the viewpoint of decreasing the surface tension of an ink, a portion of these surfactants is preferably substituted with a fluorine atom or a silicon atom.

These surfactants and solvents may be used individually or in combination.

<Other Additives>

An ink according to the present invention may further contain additives for various purposes. Depending on intended purposes to enhance various performances such as ejection stability, print head and ink cartridge compatibility, storage stability, and image storage stability, there can selectively be used, as appropriate, well-known additives such as polysaccharides, viscosity regulating agents, specific resistance regulating agents, coated film forming agents, UV absorbents, antioxidants, anti-fading agents, antifungal agents, and anti-stain agents, including, for examples, oil droplet fine particles such as liquid paraffin, dioctyl phthalate, tricresyl phosphate, or silicone oil; UV absorbents described in JP-A Nos. 57-74193, 57-87988, and 62-261476; anti-fading agents described in JP-A Nos. 57-74192, 57-87989, 60-72785, 61-146591, 1-95091, and 3-13376; and optical brightening agents described in JP-A Nos. 59-42993, 59-52689, 62-280069, 61-242871, and 4-219266.

<<Image Forming Method>>

In the method for forming an image of the present invention, image formation is carried out on a recording medium by ejecting an ink-jet ink as liquid droplets from an ink-jet head based on digital signals using a printer mounted with an ink-jet ink according to the present invention.

The ink-jet head used to carry out image formation by ejecting an ink according to the present invention may be either an on-demand system or a continuous system. Further, as the ejection system, there can be used any of the ejection systems including an electrical-mechanical conversion system (e.g., a single cavity type, a double cavity type, a vendor type, a piston type, a share mode type, and a shared-wall type) and an electrical-thermal conversion type (e.g., a thermal ink-jet type and a BUBBLE JET (a registered trademark) type). Of these, in the image forming method of the present invention, a piezo-type ink-jet recording head having a nozzle diameter of at most 30 μm is preferably used.

In the image forming method of the present invention, printing systems are not specifically limited, and either of a single-pass type or a scanning type may be employed. But the single-pass type is preferable in view of effective high-speed printing. A single-pass type method for forming an ink-jet image is an method for forming an ink-jet image in which when a recording medium is passed under one ink-jet head unit, all dots are ejected to form an image in a single passing.

As a method to realize such a single-pass type image forming method, a line-head type ink-jet head is preferably used.

Such a line-head type ink-jet head refers to an ink-jet head having a length of at least the width of a print range. In the line-head type ink-jet head, a single head may cover at least the width of a print range, or plural heads may be constituted in combination to exceed the width of the print range as disclosed in JP-A No. 2007-320278.

One example of an ink-jet recording apparatus usable for the image forming method of the present invention will now be described with reference to drawings.

FIG. 1 is a schematic view showing an ink-jet recording apparatus of a single-pass system (a line-head system) applicable to the method for forming the image of the present invention.

In FIG. 1, the symbol 11 represents a line-head type head unit, incorporating head 111-114 ejecting inks each differing in hue. The nozzle pitch of each head is preferably about 360 dpi. Herein, the dpi referred to in the present invention represents the number of dots per 2.54 cm.

Printing coated paper P, a recording medium, is sent in a roll layered state from conveyance mechanism 12 in the arrow direction. In this case, printing coated paper p may previously be heated to a predetermined temperature using heating section 13 such as an infrared heater. The image formed surface is appropriately controlled so as to have a temperature of 40° C.-90° C. specified by the present invention. In the case of at least 40° C., the effect of increasing ink viscosity is sufficiently produced. In the case of at most 90° C., the effect of increasing the viscosity is appropriately maintained and in addition, damage to a recording medium can be reduced.

Figure 2:
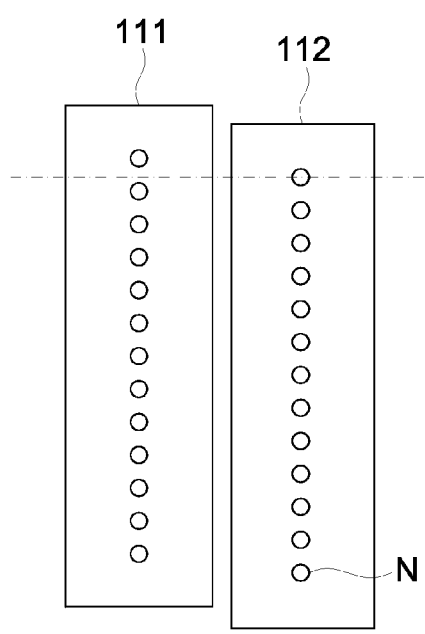
FIG. 2 is a view showing an arrangement of head 111 and head 112.

FIG. 2 is a bottom view showing a nozzle arrangement of each head bottom.

As shown in FIG. 2, nozzles N of head 111 and head 112, as well as head 113 and head 114 are placed in a zigzag arrangement so as to be displaced in a half pitch each. With such a head constitution, a more detailed image can be formed.

Figure 3:
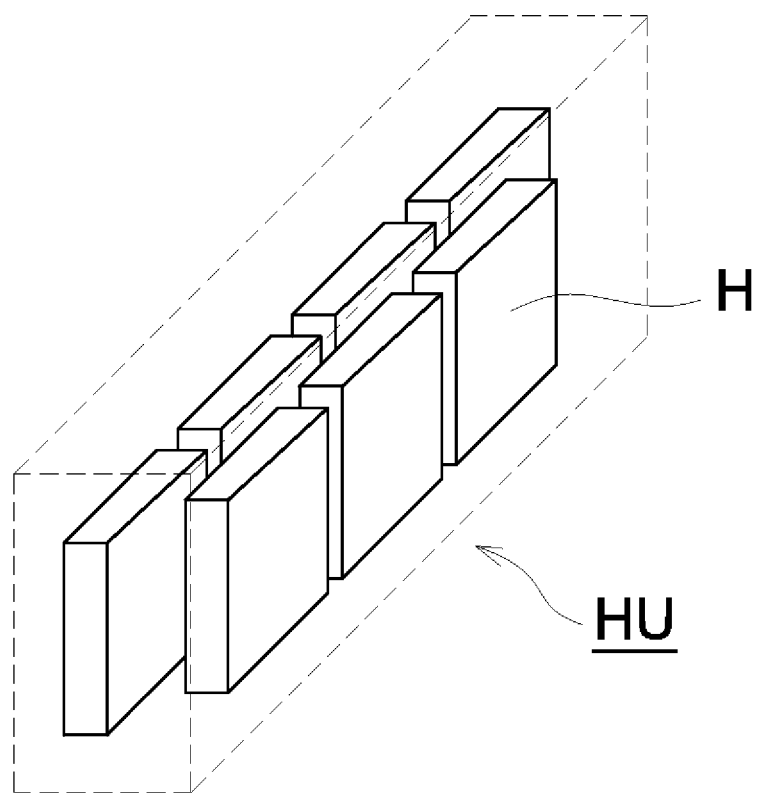
FIG. 3 is a view showing line heads.

FIG. 3 is a schematic view showing one example of a head unit constitution.

When printing coated paper P of a large printing width is used, head unit HU having plural heads H arranged in a zigzag arrangement is also preferably used to cover the entire width of printing coated paper P.

The recording medium of the present invention is not specifically limited, which may be an ink absorbable recording medium or an ink nonabsorbable recording medium. However, in the present invention, especially when the ink nonabsorbable medium is used for high-speed printing, occurrence of bleed can adequately be prevented.

EXAMPLES

The present invention will now specifically be described with reference to examples that by no means limit the scope of the present invention. Incidentally, the designation of "parts" or "%" used in the examples represents "parts by mass" or "% by mass", unless otherwise specified.

<<Preparation of Pigment Dispersions>>

(Preparation of Magenta Pigment Dispersion)

As a pigment dispersant, 3 parts by mass of JONCRYL 678, 1.3 parts by mass of dimethylaminoethanol, and 80.7 parts by mass of ion exchange water were mixed while heating. Then 15 parts by mass of C.I. Pigment Red 122 was added to this liquid mixture for premixing, followed by being dispersed using a sand grinder filled with 0.5 mm zirconia beads at a volume ratio of 50% to give a magenta pigment dispersion having a pigment solid of 15%. JONCRYL 678 is a styrene-acrylic acid copolymer (produced by BASF SE), which is a flaky resin having an acid value of 215 mgKOH/g, Tg of 85° C., an average molecular weight of 8500, and pKa of at least 5.

(Preparation of Cyan Pigment Dispersion)

As a pigment dispersant, 3 parts by mass of JONCRYL 678, 1.3 parts by mass of dimethylaminoethanol, and 80.7 parts by mass of ion exchange water were mixed while heating. Then 15 parts by mass of C.I. Pigment Blue 15:3 was added to this liquid mixture for premixing, followed by being dispersed using the sand grinder filled with 0.5 mm zirconia beads at a volume ratio of 50% to give a cyan pigment dispersion having a pigment solid of 15%.

<<Preparation of Inks>>

(Preparation of Ink 1-M)

The additives except the magenta pigment dispersion described below were mixed each at the following added amounts and sufficiently stirred and then 33 parts by mass of the magenta pigment diversion was added while stirring. After sufficient stirring, the resulting mixture was filtered with a metal filter of a mesh of #3500, followed by degassing using a hollow fiber membrane to prepare ink 1-M. Herein, JONCRYL JDX6500 is a water-soluble acrylic resin neutralized with an amine (produced by BASF SE) having an acid value of 74 mgKOH/g, Tg of 65° C., an average molecular weight of 10000, and pKa of at least 5.

| | |
|---|---|
| Magenta pigment dispersion | 33 parts by mass |
| JONCRYL JDX6500 (produced by BASF SE) | 10 parts by mass |
| Surfactant: Olefin E1010 (acetylene glycol-based surfactant, produced by Nissin Chemical Industry Co., Ltd.) | 0.5 parts by mass |

-continued

| | |
|---|---|
| Propylene glycol | 10 parts by mass |
| 1,2-Hexanediol | 5 parts by mass |
| Diethylene glycol monobutyl ether | 5 parts by mass |
| Glycerin | 20 parts by mass |
| Ammonium acetate (acetic acid: pKa = 4.76) | 2 parts by mass |
| Water | 14.5 parts by mass |

(Preparation of Ink 2-M)

| | |
|---|---|
| Magenta pigment dispersion | 33 parts by mass |
| JONCRYL JDX6500 (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Ammonium formate (formic acid: pKa = 3.75) | 2 parts by mass |
| Water | 14.5 parts by mass |

(Preparation of Ink 3-M)

| | |
|---|---|
| Magenta pigment dispersion | 33 parts by mass |
| JONCRYL JDX6500 (produced by BASF SE) | 10 parts by mass |
| Surfactant Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Ammonium tartrate (tartaric acid: pKa = 3.04) | 2 parts by mass |
| Water | 14.5 parts by mass |

(Preparation of Ink 4-M)

| | |
|---|---|
| Magenta pigment dispersion | 33 parts by mass |
| JONCRYL JDX6500 (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Ammonium nitrate (nitric acid: pKa = −1.4) | 2 parts by mass |
| Water | 14.5 parts by mass |

(Preparation of Ink 5-M)

| | |
|---|---|
| Magenta pigment dispersion | 33 parts by mass |
| JONCRYL JDX6500 (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Ammonium carbonate (carbonic acid: pKa = 10.33) | 2 parts by mass |
| Water | 14.5 parts by mass |

(Preparation of Ink 6-M)

| | |
|---|---|
| Magenta pigment dispersion | 33 parts by mass |
| JONCRYL JDX6500 (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Sodium acetate (acetic acid: pKa = 4.6) | 2 parts by mass |
| Water | 14.5 parts by mass |

(Preparation of Ink 7-M)

| | |
|---|---|
| Magenta pigment dispersion | 33 parts by mass |
| JONCRYL JDX6500 (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Water | 16.5 parts by mass |

(Preparation of Ink 8-M)

| | |
|---|---|
| Magenta pigment dispersion | 33 parts by mass |
| JONCRYL 61J (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 18 parts by mass |
| Ammonium acetate (acetic acid: pKa = 4.76) | 2 parts by mass |
| Water | 14.5 parts by mass |

Herein, JONCRYL 61J is a water-soluble styrene-acrylic resin neutralized with an amine (produced by BASF SE) having an acid value of 195 mgKOH/g, Tg of 70° C., an average molecular weight of 12000, and pKa of at least 5.

(Preparation of Ink 9-M)

JDX-C3000 is an acrylic resin (produced by BASF SE) having an acid value of 74 mgKOH/g, Tg of 65° C., an average molecular weight of 10000, and pKa of at least 5. The above resin is equal to JONCRYL JDX6500 in pKa, acid value, Tg, and average molecular weight, being an unneutralized resin, which is not neutralized an amine. Twenty-five parts by mass of JDX-C3000, 1.3 parts by mass of 1 N/l sodium hydroxide aqueous solution, and 717 parts by mass of water were added, followed by stirring while heating to give a water-soluble sodium-neutralized resin.

| | |
|---|---|
| Magenta pigment dispersion | 33 parts by mass |
| JDX-C3000 (produced by BASF SE) | 10 parts by mass |
| Surfactant: Olefin E1010 (acetylene glycol-based surfactant, produced by Nissin Chemical Industry Co., Ltd.) | 0.5 parts by mass |
| Propylene glycol | 10 parts by mass |
| 1,2-Hexanediol | 5 parts by mass |
| Diethylene glycol monobutyl ether | 5 parts by mass |
| Glycerin | 20 parts by mass |
| Ammonium acetate (acetic acid: pKa = 4.76) | 2 parts by mass |
| Water | 14.5 parts by mass |

(Preparation of Inks 1-C-9-C)

With regard to preparation of inks 1-C-9-C, inks 1-C-9-C were prepared in the same manner except that the magenta pigment dispersion is replaced with a cyan pigment dispersion of the same amount.

(Production of Inks Sets 1-9)

Ink set 1 was produced by combining ink 1-M with ink 1-C, and in the same manner, ink sets 2-9 via combinations of respective M and C were produced.

<<Formation of Print Images>>

[Formation of Image 1]

Using ink set 1, image 1 was formed on printing coated paper by the following printing method.

As an ink-jet recording apparatus, the ink-jet recording apparatus of a single-pass system (a line-head system) described in FIG. 1 was used. As printing coated paper, SA KANEFUJI (art paper, Oji Paper Co., Ltd.) was used, while being conveyed at a conveyance rate of 280 mm/s, the image formed surface of recording medium P was heated to 40° C. using heating unit 13 or 14, and then ink set 1 was ejected from head unit 11. Herein, the print surface temperature of the printing coated paper was determined using a non-contact type infrared thermometer.

With regard to each of the heads (111-114), the nozzles of two heads each featuring 360 dpi arranged in a staggered arrangement as described in FIG. 2. As shown in FIG. 3, to cover the entire width of the printing coated paper, a plurally-arranged line-head system was constituted. Ink 1-M constituting ink set 1 was ejected from head 112 and ink 1-C constituting ink set 1 was ejected from head 111 each at a print resolution of 720×720 dpi and an ink droplet amount of 16 pl. A solid cyan image of a printing rate of 100% was printed on a part of a solid magenta image of a printing rate of 100% to give Image 1.

[Formation of Images 2-9]

Using ink sets 2-9, images were formed in the same manner as in Formation of Image 1.

[Formation of Images 10-12]

Using ink set 1, images were formed in the same manner except that the image formed surface was set at 30° C., 50° C., and 60° C.

[Formation of Images 11-15]

Using ink set 1, images were formed in the same manner except that the recording medium was changed to ORAJET3650G-101 (vinyl chloride, produced by Orafol Europe GmbH) and the image formed surface was set at 50° C., 70° C., and 90° C.

<<Evaluation of Formed Images>>

[Evaluation of Bleeding Resistance]

A solid image was printed in which a cyan image of a printing rate of 100% was printed on a part of a magenta image of a printing rate of 100%. The presence or absence of occurrence of bleeding (image bleeding) was visually observed. Bleeding resistance was evaluated based on the following criteria.

A: Almost no bleeding occurrence is noted.

B: Bleeding of a cyan image of less than 0.5 mm was noted.

C: Bleeding of a cyan image of 0.5 mm-less than 1.0 mm was noted.

D: Bleeding of a cyan image of at least 0.5 mm was noted.

TABLE 1

| Image No. | Ink Set No. | Resin | pKa Acid Component | Recording Medium | Heating Temperature (° C.) | Bleeding Resistance | Remarks |
|---|---|---|---|---|---|---|---|
| 1 | 1 | Large | 4.76 | Art paper | 40 | A | Inventive |
| 2 | 2 | Large | 3.75 | Art paper | 40 | A | Inventive |
| 3 | 3 | Large | 3.04 | Art paper | 40 | A | Inventive |
| 4 | 4 | Large | −1.4 | Art paper | 40 | A | Inventive |
| 5 | 5 | Small | 10.33 | Art paper | 40 | C | Comparative |
| 6 | 6 | Large | 4.6 | Art paper | 40 | C | Comparative |
| 7 | 7 | — | — | Art paper | 40 | D | Comparative |
| 8 | 8 | Large | 4.76 | Art paper | 40 | A | Inventive |
| 9 | 9 | Large | 4.76 | Art paper | 40 | A | Inventive |
| 10 | 1 | Large | 4.76 | Art paper | 30 | B | Inventive |
| 11 | 1 | Large | 4.76 | Art paper | 50 | A | Inventive |
| 12 | 1 | Large | 4.76 | Art paper | 60 | A | Inventive |
| 13 | 1 | Large | 4.76 | Vinyl chloride | 50 | A | Inventive |
| 14 | 1 | Large | 4.76 | Vinyl chloride | 70 | A | Inventive |
| 15 | 1 | Large | 4.76 | Vinyl chloride | 90 | A | Inventive |

The results described in Table 1 clearly show that the images formed based on the image forming method of the present invention exhibit enhanced bleeding resistance compared to the comparative examples.

| DESCRIPTION OF THE SYMBOLS | |
|---|---|
| 11: | head units |
| 111, 112, 113, and 114: | heads |
| 12: | conveyance mechanism |
| 13: | heating section |
| 14: | temperature control plate |
| P: | printing coated paper |

What is claimed is:

1. A method for forming an ink-jet image comprising steps of:
heating at least one surface of a recording medium to a temperature from 40° C. to 90° C.,
ejecting an aqueous ink-jet ink comprising a water, a pigment, an organic or an inorganic acid, an amine, and a resin having higher pKa than the organic or the inorganic acid onto the surface of the recording medium.

2. The method for forming the ink-jet image of claim 1, wherein the organic or the inorganic acid and the amine are formed by a dissociation of an ammonium salt.

3. The method for forming the ink-jet image of claim 1, wherein a content of the organic or the inorganic acid in an ink is from 0.1% to 10% by mass based on the ink.

4. The method for forming the ink-jet image of claim 3, wherein a concentration of the amine in the ink is from 0.01 mol/L to 3 mol/L.

5. The method for forming the ink-jet image of claim 4, wherein pKa of the acid is 5 or less.

6. The method forming the ink-jet image of claim 5, wherein a content of the water in the ink is from 20% to 90% by mass based on the ink.

7. The method for forming the ink-jet image of claim 6, wherein the pigment is dispersed in a resin having higher pKa than the organic or the inorganic acid.

8. The method for forming the ink-jet image of claim 7, wherein the heated surface of the recording medium is ink nonabsorbable.

9. The method for forming the ink-jet image of claim 1, wherein a concentration of the amine in the ink is from 0.01 mol/L to 3 mol/L.

10. The method for forming the ink-jet image of claim 1, wherein pKa of the acid is 5 or less.

11. The method for forming the ink-jet image of claim 1, wherein a content of the water in the ink is from 20% to 90% by mass based on the ink.

12. The method for forming the ink-jet image of claim 1, wherein the pigment is dispersed in a resin having higher pKa than the organic or the inorganic acid.

13. The method for forming the ink-jet image of claim 1, wherein the heated surface of the recording medium is ink nonabsorbable.

14. The method for forming the ink-jet image of claim 1, wherein a difference of pKa between the acid and the resin is 0.5 or more.

* * * * *